United States Patent
Yamashita

(10) Patent No.: US 7,673,613 B2
(45) Date of Patent: Mar. 9, 2010

(54) CONTROLLER FOR INTERNAL COMBUSTION ENGINE

(75) Inventor: Hiroshi Yamashita, Anjo (JP)

(73) Assignee: Denso Corporation, Kariya (JP)

( * ) Notice: Subject to any disclaimer, the term of this patent is extended or adjusted under 35 U.S.C. 154(b) by 134 days.

(21) Appl. No.: 12/124,853

(22) Filed: May 21, 2008

(65) Prior Publication Data
US 2009/0030588 A1    Jan. 29, 2009

(30) Foreign Application Priority Data
Jul. 23, 2007  (JP)  ............ 2007-191323

(51) Int. Cl.
  *F02D 11/10*  (2006.01)
  *F02D 41/14*  (2006.01)
  *F02P 5/15*  (2006.01)
(52) U.S. Cl. ............ 123/399; 123/406.3; 123/406.31; 123/1 A
(58) Field of Classification Search ............ 123/1 A, 123/399, 406.15, 406.3, 406.31
See application file for complete search history.

(56) References Cited

U.S. PATENT DOCUMENTS

| | | | |
|---|---|---|---|
| 4,732,120 A | 3/1988 | Naito et al. | |
| 6,915,782 B2 * | 7/2005 | Hanada et al. | 123/399 |
| 7,559,316 B2 * | 7/2009 | Matsushita et al. | 123/525 |
| 2005/0003926 A1 * | 1/2005 | Hanada et al. | 477/3 |
| 2006/0101823 A1 * | 5/2006 | Takemoto et al. | 60/716 |
| 2008/0000457 A1 * | 1/2008 | Matsushita et al. | 123/525 |
| 2009/0173314 A1 * | 7/2009 | Whitney et al. | 123/350 |

FOREIGN PATENT DOCUMENTS

| | | |
|---|---|---|
| JP | 1-113528 | 5/1989 |
| JP | 5-65835 | 3/1993 |

* cited by examiner

*Primary Examiner*—Erick Solis
(74) *Attorney, Agent, or Firm*—Nixon & Vanderhye PC

(57) ABSTRACT

An ignition timing is established according to alcohol concentration of fuel detected by an alcohol concentration sensor. In a torque control where a throttle opening is controlled in such a manner that an estimated torque follows an target torque, when obtaining the estimated incylinder filling air quantity, the throttle opening is varied by correcting the estimated incylinder filling air quantity according to the detected alcohol concentration. Thereby, the variation in torque due to the correction of the ignition timing according to the alcohol concentration can be compensated by the variation in torque due to the correction of the estimated incylinder filling air quantity (the throttle opening). The variation in output torque due to difference of the alcohol concentration of the fuel is decreased.

7 Claims, 7 Drawing Sheets

CONTROLLER FOR INTERNAL COMBUSTION ENGINE

CROSS-REFERENCE TO RELATED APPLICATION

This application is based on Japanese Patent Application No. 2007-191323 filed on Jul. 23, 2007, the disclosure of which is incorporated herein by reference.

FIELD OF THE INVENTION

The present invention relates to a controller for an internal combustion engine, which adjusts an ignition timing according to fuel property.

BACKGROUND OF THE INVENTION

Gasoline, alcohol such as ethanol and methanol, and alcohol mixed fuel of gasoline and alcohol are used as fuel for an internal combustion engine. In a system including such an engine, as shown in JP-1-113528A, an alcohol concentration in the fuel is detected by a fuel sensor. An ignition timing and an air-fuel ratio are determined based on the alcohol concentration, whereby the ignition timing and the air-fuel ratio are controlled preferably.

Generally, in an internal combustion engine, a combustion efficiency becomes best at minimum advance for the best torque (MBT) that is immediately before a knocking occurs. As the alcohol concentration and the octane number become high, a knock limit of the ignition timing is advanced. In a system where the ignition timing is established according to the alcohol concentration, an output torque of the engine can be increased while the knocking is prevented by advancing the ignition timing as the alcohol concentration becomes high. In such a ignition timing control, in a case that a low-alcohol-concentration fuel is used, the ignition timing is retarded relative to a case of a high-alcohol-concentration fuel, which may reduce the output torque and deteriorate a drivability of the engine. The fuel of which alcohol concentration is low is referred to as low-alcohol-concentration fuel and the fuel of which alcohol concentration is high is referred to as high-alcohol-concentration fuel.

SUMMARY OF THE INVENTION

The present invention is made in view of the above matters, and it is an object of the present invention to provide a controller for an internal combustion engine which can reduce a variation of the output torque due to a difference of the fuel property and improve the drivability of the engine.

According to the present invention, a controller includes a fuel property detecting means for detecting a property of fuel supplied to the internal combustion engine, and an ignition timing establishing means for establishing an ignition timing according to the fuel property detected by the fuel property detecting means. The controller further includes a target torque establishing means for establishing a target torque, an output torque estimating means for estimating an output torque, and a torque control means for performing a torque control in such a manner that the output torque follows the target torque. When obtaining the estimated torque, the output torque estimating means corrects the estimated torque according to the fuel property so as to vary a control amount of the torque control.

With this configuration, the ignition timing is established according to the fuel property. Hence, the ignition timing is controlled to a proper value according to the fuel property and a suitable combustion is assured without knocking. Furthermore, in a torque control where the estimated torque follows the target torque, when obtaining the estimated torque, the estimated torque is corrected according to the fuel property and a control amount of the torque control is varied. Thereby, the variation in torque due to the correction of the ignition timing according to the fuel property can be compensated by the variation in torque due to the correction of the estimated torque. The variation in output torque due to a difference of the fuel property is decreased, and a drivability of the engine can be improved.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

An embodiment of the present invention will be described hereinafter with reference to the drawings. In this embodiment, the present invention is applied to a bi-fuel engine for a vehicle which can use gasoline, alcohol, and alcohol mixed fuel of gasoline and alcohol.

Figure 1:
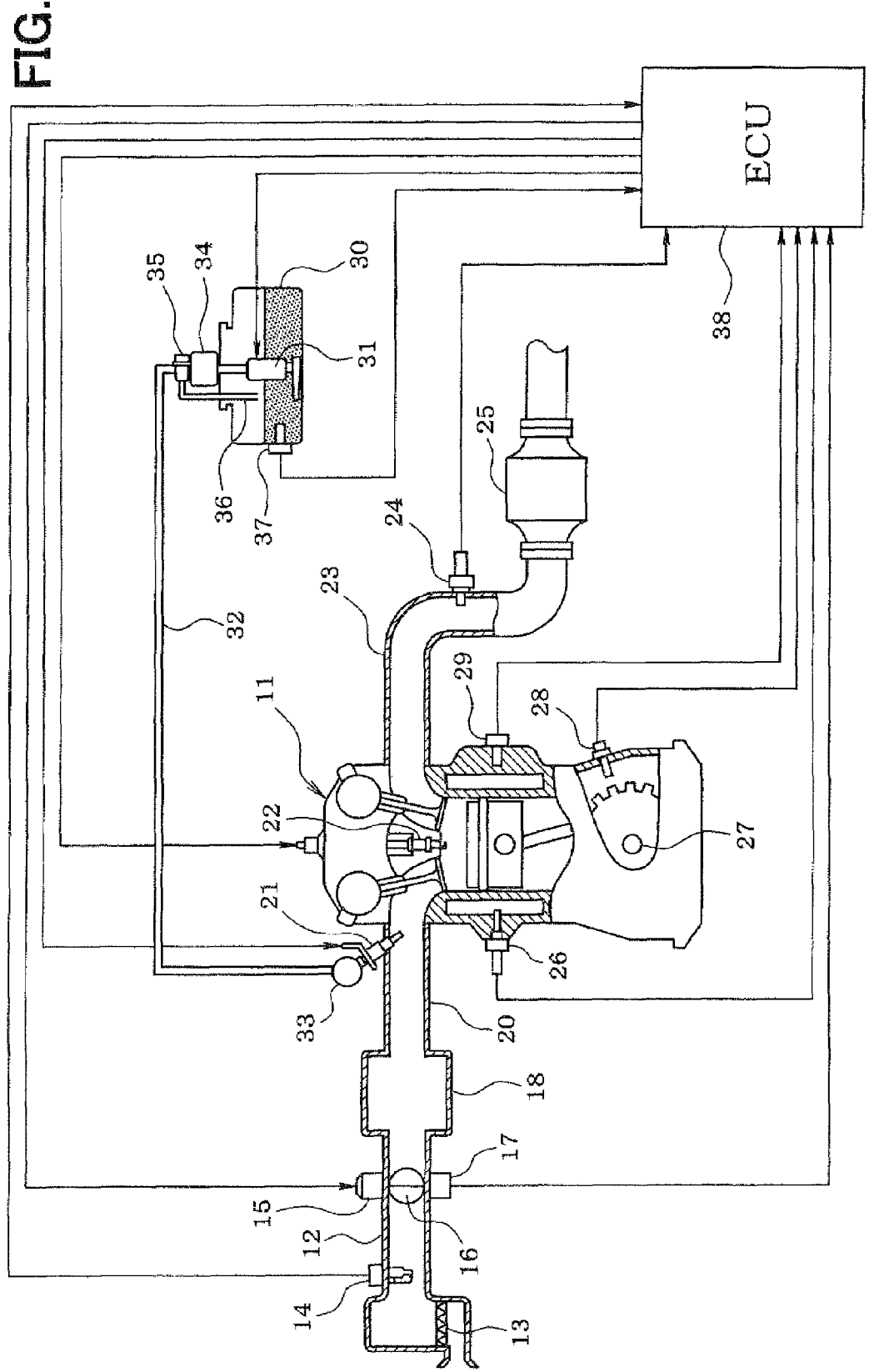
FIG. 1 is a schematic view of an engine control system according to an embodiment of the present invention.

Referring to FIG. 1, an engine control system is explained.

An air cleaner 13 is arranged upstream of an intake pipe 12 of an internal combustion engine 11. An airflow meter 14 detecting an intake air flow rate is provided downstream of the air cleaner 13, A throttle valve 16 driven by a DC-motor 15 and a throttle position sensor 17 detecting a throttle position (throttle opening angle) are provided downstream of the air flow meter 14.

A surge tank 18 is provided downstream of the throttle valve 16. An intake air manifold 20 is connected to the surge tank 18 to introduce air into the engine 11. A fuel injector 21 is provided at a vicinity of an intake air port of the intake manifold of each cylinder to inject fuel into the cylinder. A spark plug 22 is mounted on a cylinder head of the engine 11 corresponding to each cylinder to ignite air-fuel mixture in each cylinder.

An exhaust gas sensor (an air fuel ratio sensor, an oxygen sensor) 24 which detects an air-fuel ratio of the exhaust gas is respectively provided in each exhaust pipe 23, and a three-way catalyst 25 which purifies the exhaust gas is provided downstream of the exhaust gas sensor 24.

A coolant temperature sensor 26 detecting a coolant temperature and a knock sensor 29 detecting knocking of the engine are disposed on a cylinder block of the engine 11. A crank angle sensor 28 is installed on a cylinder block to output crank angle pulses when a crank shaft 27 rotates a predetermined angle. Based on this crank angle pulses, a crank angle and an engine speed are detected.

The engine 11 can use gasoline, alcohol such as ethanol and methanol, and alcohol mixed fuel of gasoline and alcohol. Any one of gasoline, alcohol, and alcohol mixed fuel is supplied to the engine 11. A fuel pump 31 which pumps up the fuel is provided in a fuel tank 30 which stores the fuel. The fuel discharged from the fuel pump 31 is sent to the delivery pipe 33 through the fuel pipe 32, and is distributed to the fuel injector 21 of each cylinder from this delivery pipe 33. A filter 34 and a pressure regulator 35 are connected to the fuel pipe 32. A discharge pressure of the fuel pump 31 is adjusted to a predetermined pressure by the pressure regulator 35. A surplus of the fuel exceeding the predetermined pressure is returned to the fuel tank 30 through a fuel-return pipe 36.

An alcohol concentration sensor 37 which detects alcohol concentration (fuel property) of the fuel in the fuel tank 30 is provided in the fuel tank 30. The alcohol concentration sensor 37 may be provided in the fuel pipe 32 between the fuel tank 30 and the fuel injector 21.

The outputs of the sensors are inputted to an electronic control unit (ECU) 38. The ECU 38 includes a microcomputer which executes an engine control program stored in a ROM (Read Only Memory) to control a fuel injection quantity and an ignition timing according to an engine running condition.

Figure 6:
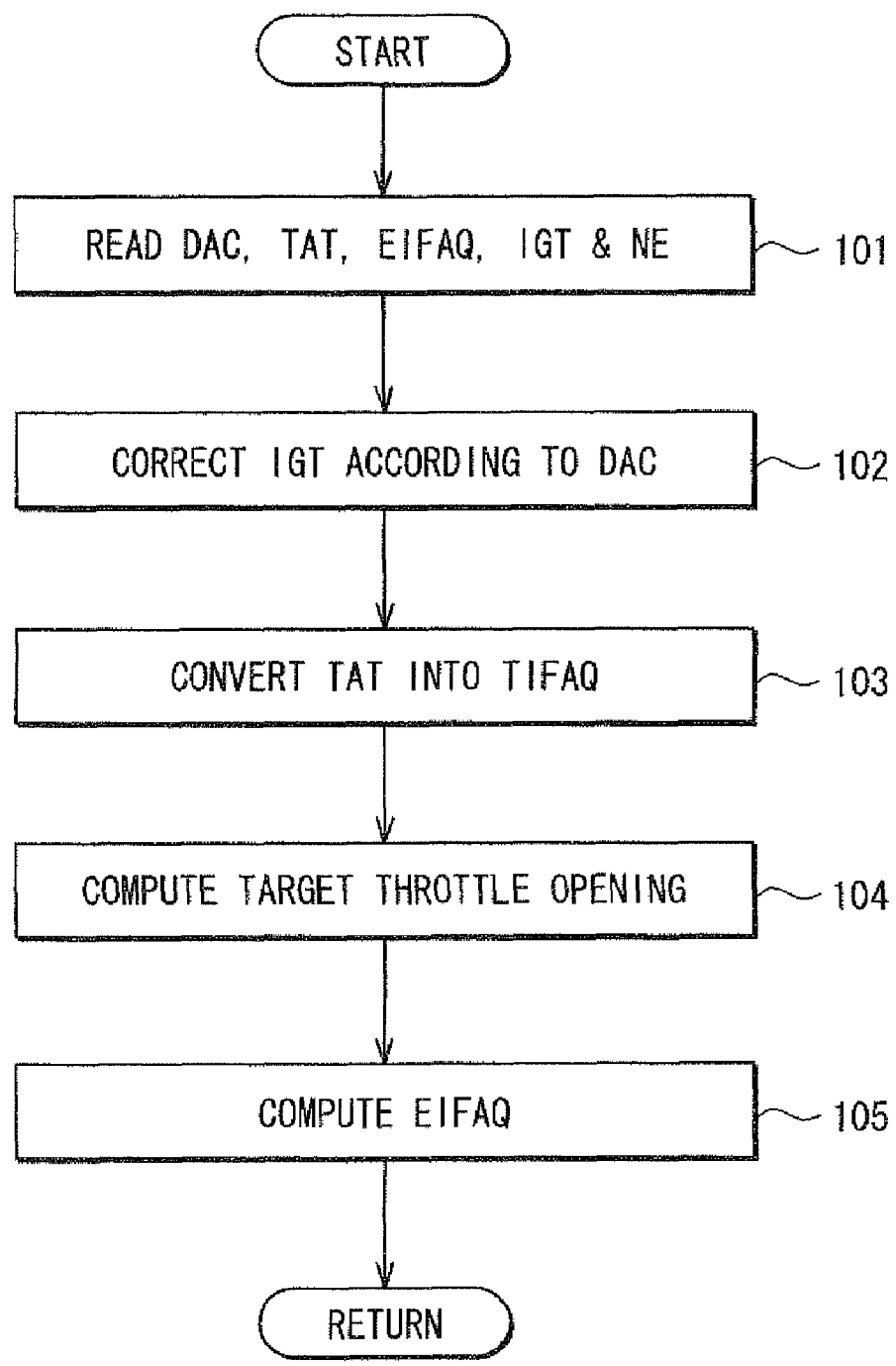
FIG. 6 is a flowchart showing a process of a torque control routine.

The ECU 38 executes a torque control routine shown in FIG. 6. Generally, in an internal combustion engine, a combustion efficiency becomes best at minimum advance for the best torque (MBT) that is immediately before a knocking occurs. As the alcohol concentration and the octane number become high, a knock limit of the ignition timing is advanced. Hence, as the alcohol concentration detected by the alcohol concentration sensor 37 becomes higher, the ignition timing is advanced, whereby a suitable combustion is conducted and the output torque is increased while preventing an occurrence of knocking.

In such an ignition timing control, in a case that gasoline is used, the ignition timing is retarded and the output torque is reduced relative to a case that 100% of ethanol is used.

According to the present invention, a target torque of the engine 11 is established and an output torque is estimated. A torque control is performed in such a manner that the estimated output torque follows the target torque. In this torque control, the target torque is represented by a target incylinder filling air quantity, that is, a target intake air flow rate. The estimated torque is represented by an estimated incylinder filling air quantity, that is, an estimated intake air quantity. A throttle opening, which is an opening degree of the throttle valve 16, is adjusted in such a manner that the estimated incylinder filling air quantity follows the target incylinder filling air quantity.

Figure 4:
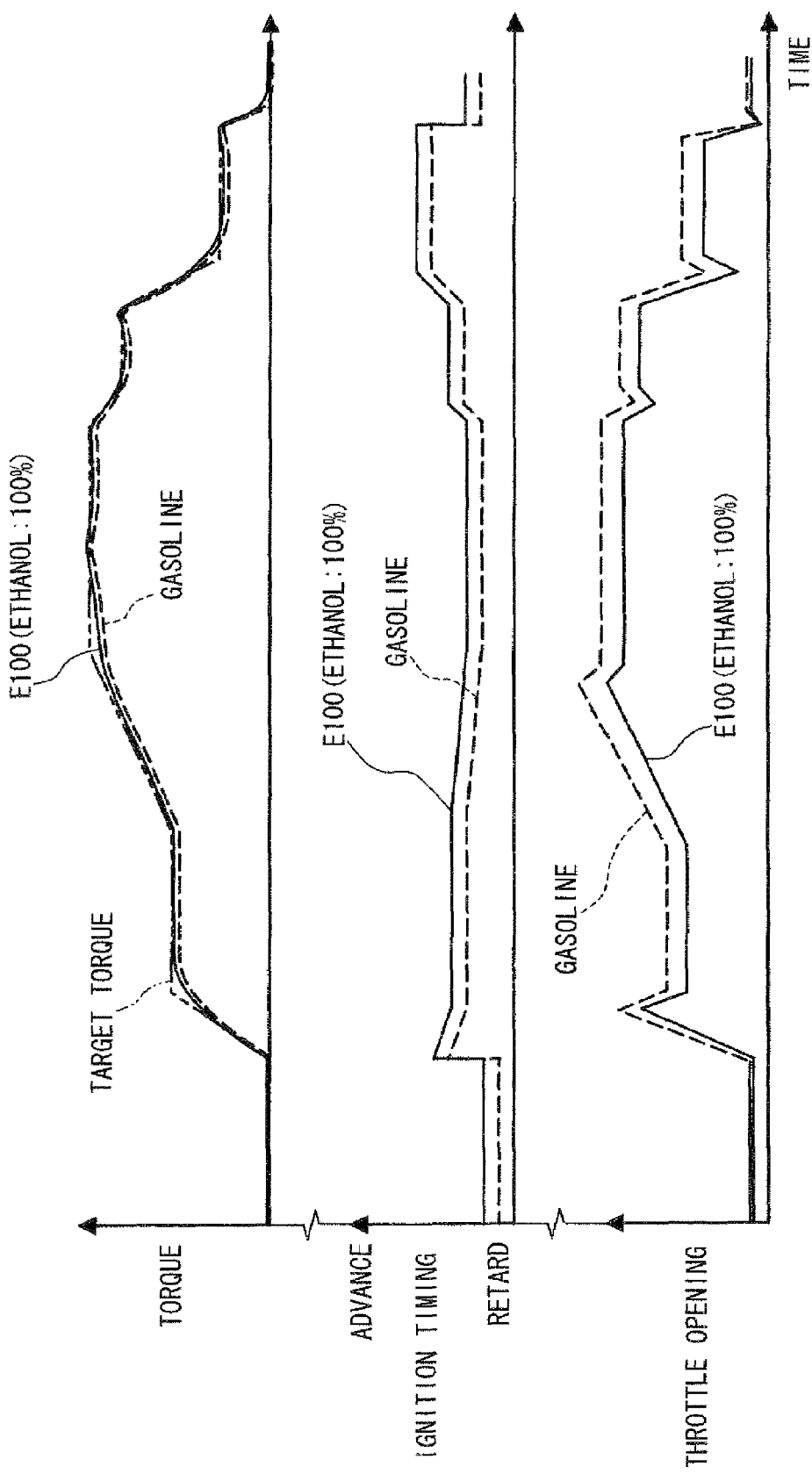
FIG. 4 is a time chart for explaining a torque control.

As shown in a time chart of FIG. 4, when the estimated incylinder filling air quantity is obtained in the torque control, the estimated incylinder filling air quantity is corrected according to the detected alcohol concentration to vary the throttle opening, whereby a variation in torque due to a correction of the ignition timing is compensated by a variation in torque due to a correction of the estimated incylinder filling air quantity (the throttle opening) so that the variation in the output torque due to a difference in alcohol concentration can be reduced.

Figure 2:
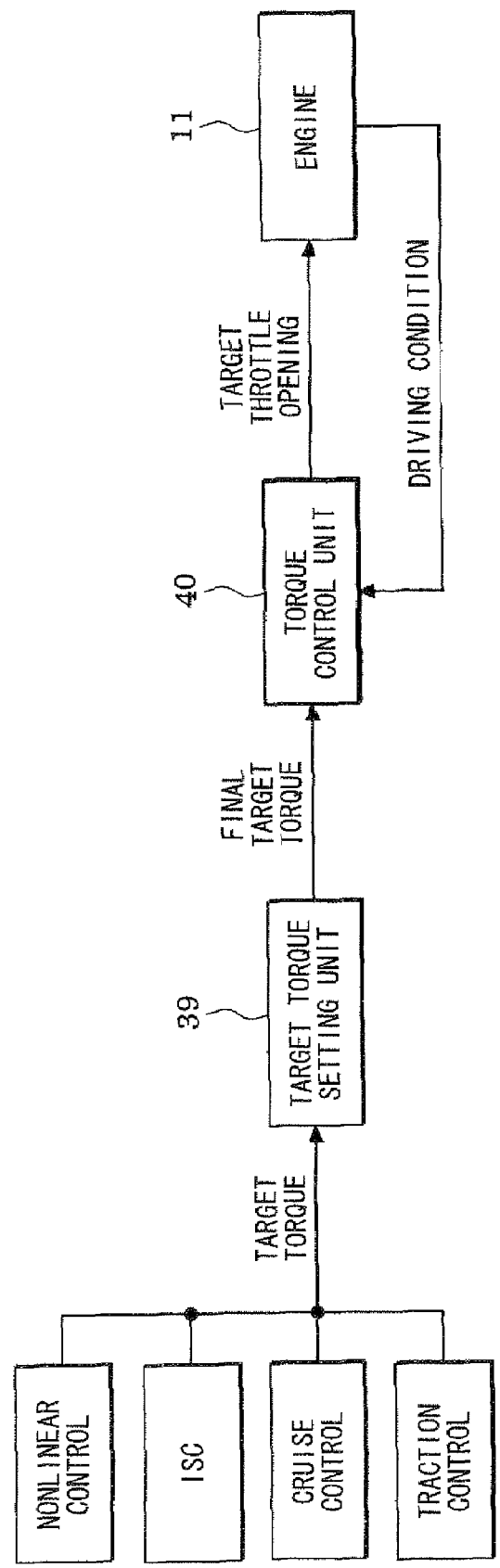
FIG. 2 is a block diagram showing a torque control system.

Specifically, as shown in FIG. 2, a target torque setting unit 39 selects a final target torque from the target torques each of which is established by a nonlinear control, an idle speed control (ISC), a cruise control, a traction control, and the like. The nonlinear control is a control in which the target torque is set according to the accelerator position. The target torque setting unit 39 outputs the final target torque to a torque control unit 40.

Figure 3:
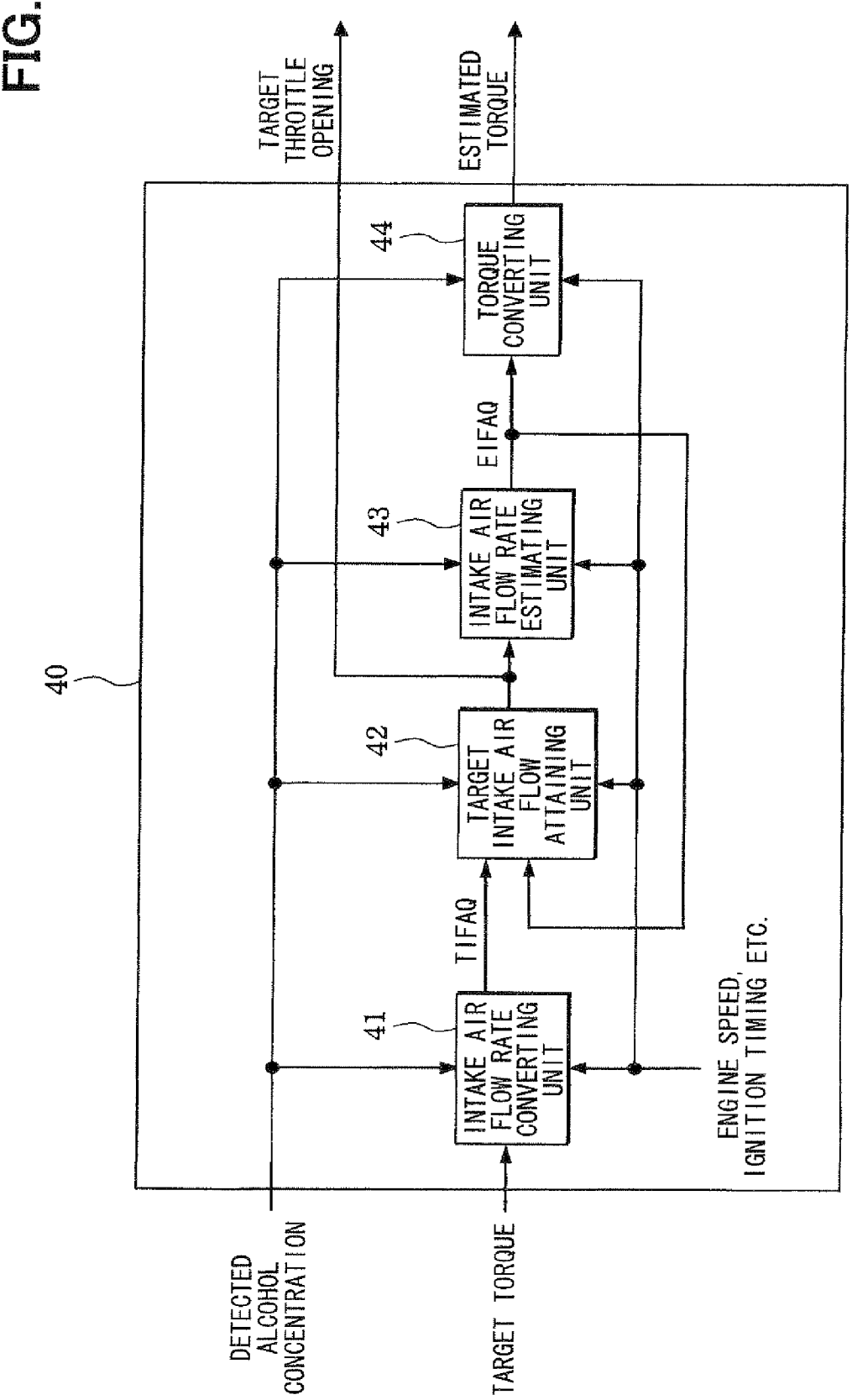
FIG. 3 is a block diagram for explaining a function of a torque control portion.

As shown in FIG. 3, the torque control unit 40 converts the target torque into the target incylinder filling air quantity by use of an engine speed, an ignition timing, an alcohol concentration in an intake air flow rate converting unit 41. After the above conversion, a target intake air flow attaining unit 42 computes the target throttle opening in order that the estimated incylinder filling air quantity follows the target incylinder filling air quantity.

Then, an intake air flow rate estimating unit 43 computes an estimated incylinder filling air quantity, which is a quantity after one computation period has elapsed, based on the target throttle opening by use of a physical model considering at least one of an air flow rate passing through the throttle valve and a delay in response of intake system. This estimated incylinder filling air quantity is corrected by the alcohol concentration to obtain the final estimated incylinder filling air quantity. The estimated incylinder filling air quantity is corrected in such a manner that the target throttle opening becomes larger as the detected alcohol concentration becomes lower. The variation in torque due to a correction of the ignition timing is compensated by a variation in torque due to a correction of the estimated incylinder filling air quantity.

A torque converting unit 44 converts the estimated incylinder filling air quantity into an estimated torque by use of the engine speed, the ignition timing, the detected alcohol concentration and the like.

The torque control unit 40 outputs the target throttle opening to the engine 11 and controls the motor 15 of the throttle valve 16 in such a manner that the actual throttle opening becomes equal to the target throttle opening. Consequently, the estimated incylinder filling air quantity follows the target incylinder filling air quantity.

In a case that the alcohol concentration sensor 37 is abnormal, if an ordinal control is continued, the output torque is excessively controlled based on the alcohol concentration which is erroneously detected.

Figure 7:
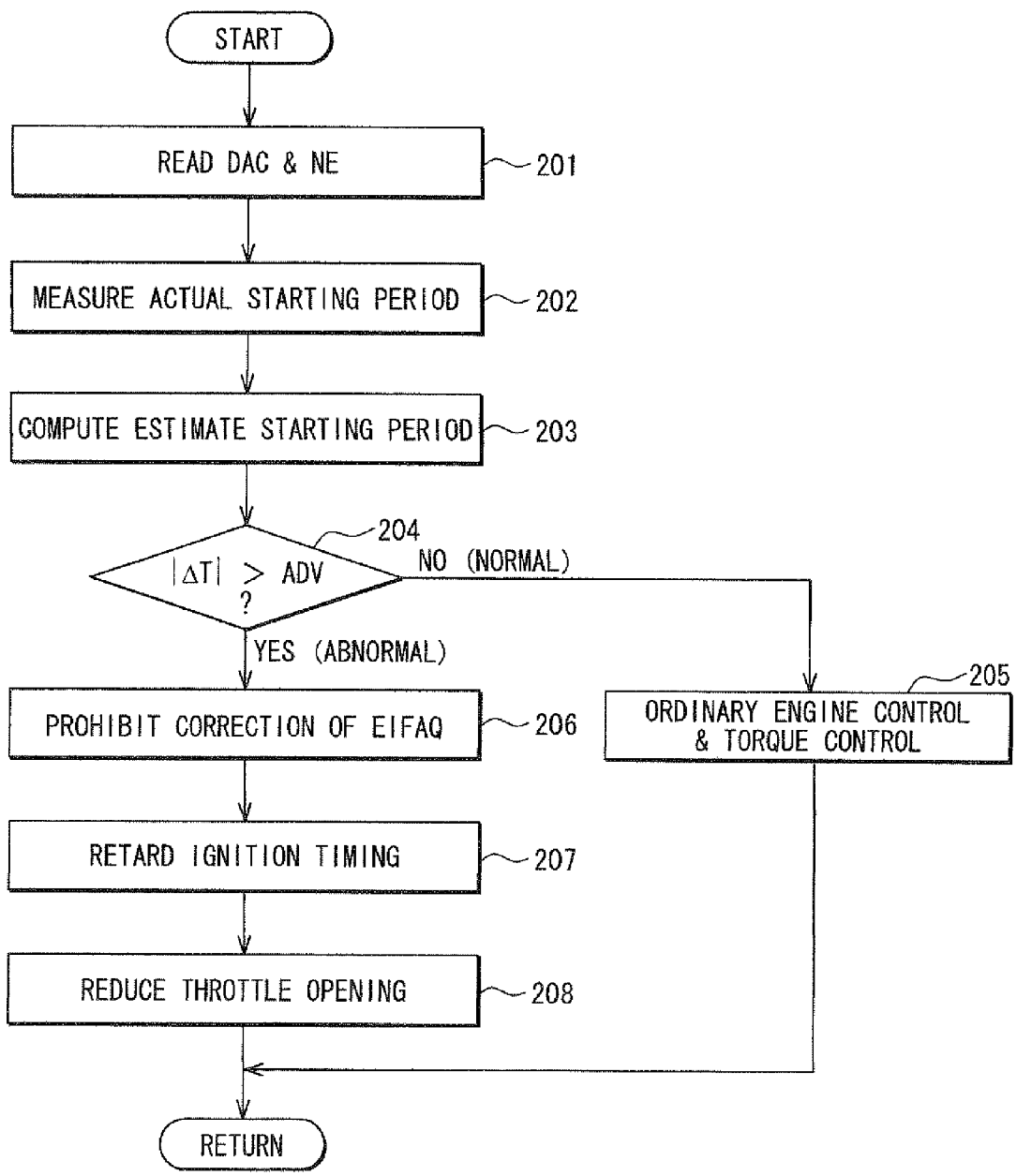
FIG. 7 is a flowchart showing a process of an abnormality diagnosis routine.

According to the present embodiment, the ECU 38 performs an abnormal diagnosis routine shown in FIG. 7, whereby the ECU 38 determines whether the alcohol concentration sensor 37 is abnormal. When the ECU determines that the alcohol concentration sensor 37 is abnormal, the correction of the estimated incylinder filling air quantity based on the alcohol concentration is prohibited, and a correction process in which an ignition timing is retarded relative to an ordinal ignition timing and a correction process in which the throttle opening is decreased relative to an ordinal throttle opening are performed. Hence, even if the alcohol concentration sensor 37 is abnormal, it can be avoided that the output torque is excessively controlled based on the erroneous alcohol concentration.

Figure 5:
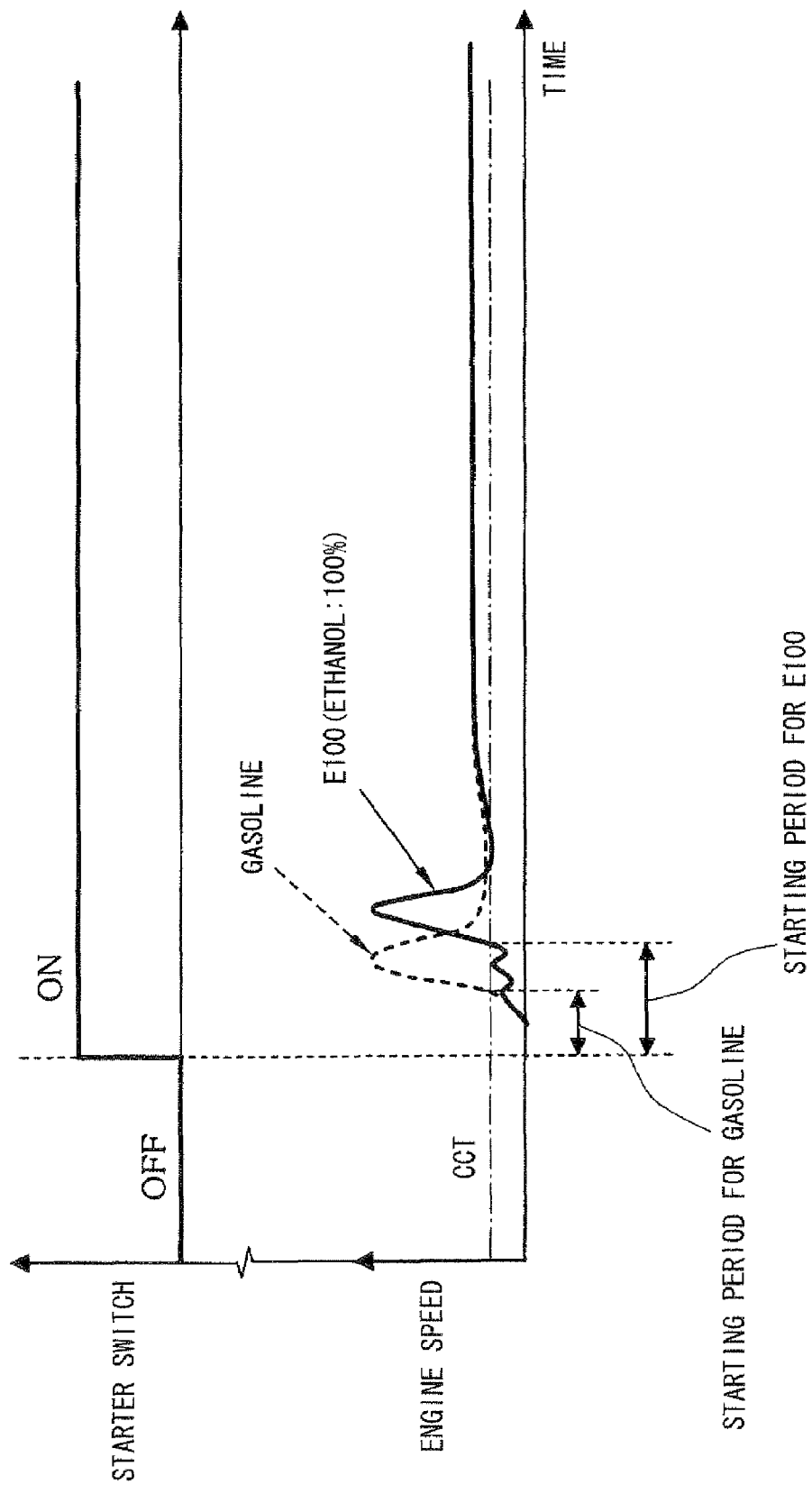
FIG. 5 is a time chart for explaining an actual start period.

FIG. 5 is a time chart showing one of the abnormal diagnosis methods of the alcohol concentration sensor 37. In this diagnosis shown in FIG. 5, an actual starting period of the engine 11 is measured from a time when a cranking is started to a time when the cranking is completed. That is, the actual starting period from a time when a starter switch is turned on to a time when the engine speed exceeds a complete combustion threshold CCT is measured. At the same time, an estimate starting period of the engine 11 is computed based on the detected alcohol concentration by use of a map. By comparing the estimated starting period with the actual starting period, it is determined whether the alcohol concentration sensor 37 is abnormal.

According to the actual alcohol concentration, an atomizing characteristic of the fuel is varied and the actual starting period is also varied. In a case that the alcohol concentration sensor 37 is normal and the detected alcohol concentration is substantially equal to the actual alcohol concentration, the estimated starting period is substantially equal to the actual starting period. If the alcohol concentration sensor 37 is abnormal and the detected alcohol sensor is largely different from the actual alcohol concentration, a deviation between the estimated starting period and the actual starting period becomes large. Hence, by comparing the estimated starting period with the actual starting period, it is accurately determined whether the alcohol concentration sensor 37 is abnormal at starting of the engine 11.

Referring to FIGS. 6 and 7, the torque control routine and the abnormal diagnosis routine are described.

[Torque Control Routine]

The torque control routine is executed at specified intervals while the ECU 38 is ON. In step 101, the ECU 38 reads the detected alcohol concentration DAC, the target torque TAT, the estimated incylinder filling air quantity EIFAQ, the ignition timing IGT, and the engine speed NE.

In step 102, the ignition timing IGT of the spark plug 22 is corrected according to the detected alcohol concentration DAC. In this moment, a correction amount of the ignition timing IGT according to the detected alcohol concentration DAC is computed by use of a map. The ignition timing IGT of the spark plug 22 is corrected by this correction amount. In the ignition timing correction map, as the detected alcohol concentration becomes higher, the ignition timing is more advanced. Hence, the ignition timing is advanced as the alcohol concentration becomes high, and a suitable combustion is assured without occurring of knocking so that the output torque is increased.

In step 103, the target torque is converted into the target incylinder filling air quantity by use of the corrected ignition timing IGT, the engine speed NE, the detected alcohol concentration DAC. In step 104, the target throttle opening is computed in such a manner that the estimated incylinder filling air quantity EIFAQ follows the target incylinder filling air quantity TIFAQ.

Then in step 105, the estimated incylinder filling air quantity EIFAQ, which is a quantity after one computation period has elapsed, is computed based on the target throttle opening by use of a physical model considering at least one of an air flow rate passing through the throttle valve and a delay in response of intake system. This estimated incylinder filling air quantity EIFAQ is corrected according to the detected alcohol concentration DAC to obtain the final estimated incylinder filling air quantity. The estimated incylinder filling air quantity is corrected in such a manner that the target throttle opening becomes larger as the detected alcohol concentration becomes lower. The variation in torque due to a correction of the ignition timing is compensated by a variation in torque due to a correction of the estimated incylinder filling air quantity.

[Abnormal Diagnosis Routine]

The abnormal diagnosis routine is executed at specified intervals while the ECU 38 is ON. In step 201, the ECU 38 reads the detected alcohol concentration DAC and the engine speed NE.

In step 202, the actual starting period of the engine 11 is measured, that is, the period from the starting time when the starter switch is turned on to the completing time when the engine speed exceeds the complete combustion threshold is measured.

Then, in step 203, the estimate starting period of the engine 11 is computed based on the detected alcohol concentration by use of the map. The estimated starting period of the engine 11 is corrected based on at least one of coolant temperature, oil temperature, intake air temperature, and atmospheric pressure. Thereby, the estimated starting period of the engine 11 is varied corresponding to the variation in atomization characteristic of fuel due to engine temperature (coolant temperature, oil temperature), intake air temperature, and atmospheric pressure.

In step 204, it is determined whether the alcohol concentration sensor 37 is normal based on whether an absolute value of a difference $\Delta T$ between the estimated starting period and the actual starting period is greater than an abnormality determination value ADV.

When the answer is No in step 204, the ECU 38 determines that the alcohol concentration sensor 37 is normal and the procedure proceeds to step 205. In step 205, the ordinary engine control and the ordinary torque control are performed.

When the answer is Yes in step 204, the ECU 38 determines that the alcohol concentration sensor is abnormal and the procedure proceeds to step 206. In step 206, the correction of the estimated incylinder filling air quantity EIFAQ according to the detected alcohol concentration is prohibited.

Then, the procedure proceeds to step 207 in which a correction for retarding the ignition timing relative to the normal timing is performed. That is, the torque is reduced. In this case, the alcohol concentration is fixed at a certain concentration (for example, 0%) in which the ignition timing is most retarded, and the ignition timing is corrected in a retard direction.

Then, the procedure proceeds to step 208 in which a correction for reducing the throttle opening is performed. That is, the torque is reduced. In this case, the alcohol concentration is fixed at a certain concentration (for example, 100%) in which the target throttle opening is minimum, and the throttle opening is corrected in a closing direction.

By performing processes in steps 206 to 208, even if the alcohol sensor 37 is abnormal, it can be avoided that the output torque is excessively controlled based on the erroneous alcohol concentration. Only one of the correction for retarding the ignition timing and the correction for closing the throttle valve may be performed.

According to the embodiment described above, since the ignition timing is established according to the alcohol concentration detected by the alcohol concentration sensor 37, the ignition timing is controlled to a proper value according to the alcohol concentration, and a suitable combustion is assured without knocking. Furthermore, in the torque control where the throttle opening is controlled so that the estimated torque follows the target torque, when the estimated incylinder filling air quantity is obtained, the estimated incylinder filling air quantity is corrected according to the detected alcohol concentration to vary the throttle opening, whereby the variation in torque due to the correction of the ignition timing can be compensated by the variation in torque due to the correction of the estimated incylinder filling air quantity (the throttle opening). Thereby, the variation in the output torque due to a difference in alcohol concentration can be reduced and a drivability of the engine is improved.

According to the present embodiment, it is determined whether the alcohol concentration sensor 37 is abnormal. When it is determined that the alcohol concentration sensor 37 is abnormal, the correction of the estimated incylinder filling air quantity based on the alcohol concentration is prohibited. The correction process in which the ignition timing is retarded relative to an ordinal ignition timing and a correction process in which the throttle opening is decreased relative to an ordinal throttle opening are performed. Hence, even if the alcohol concentration sensor 37 is abnormal, it can be avoided that the output torque is excessively controlled based on the erroneous alcohol concentration.

Furthermore, in present embodiment, the actual starting period of the engine 11 is measured and the estimated starting period of the engine 11 is computed based on the detected alcohol concentration. By comparing the estimated starting period with the actual starting period, it is accurately determined whether the alcohol concentration sensor 37 is abnormal at starting the engine 11.

Furthermore, since the estimated starting period is corrected according to at least one of the coolant temperature, the oil temperature, the intake air temperature, and the atmospheric pressure, the estimated starting period can be varied according to the variation in atomization characteristic of the fuel, so that the accuracy of the abnormality diagnosis of the alcohol sensor 37 can be improved.

The actual starting period and the abnormality determination value ADV may be corrected based on at least one of the coolant temperature, the oil temperature, the intake air temperature, and the atmospheric pressure.

It may be determined whether the alcohol concentration sensor 37 is abnormal based on whether a ratio between the estimated starting period and the actual starting period is greater than an abnormality determination value. The abnormality diagnosis method of the alcohol concentration sensor 37 is not limited to the above embodiment, and can be modified in a suitable manner.

In the above embodiment, when performing the torque control, the throttle opening is controlled in such a manner that the estimated incylinder filling air quantity follows the target incylinder filling air quantity. Alternatively, at least one of the throttle opening, an intake valve lift amount, an intake valve opening timing, an exhaust valve opening timing, and a waste gate valve opening may be controlled in order to perform the torque control.

In the above embodiment, the intake air flow rate is controlled in such a manner that the estimated torque follows the target torque. Alternatively, the fuel injection quantity may be controlled in such a manner that the estimated torque follows the target torque.

In the above embodiment, the alcohol concentration is detected as the fuel property and the ignition timing is established according to the alcohol concentration. The fuel property may include gasoline concentration, a light refraction index, a light transmission, viscosity of fuel, relative density of fuel, evaporativity of fuel, and the like.

What is claimed is:

1. A controller for an internal combustion engine, comprising:
   a fuel property detecting means for detecting a property of fuel supplied to the internal combustion engine;
   an ignition timing establishing means for establishing an ignition timing according to the fuel property detected by the fuel property detecting means;
   a target torque establishing means for establishing a target torque of the internal combustion engine;
   an output torque estimating means for estimating an output torque of the internal combustion engine; and
   a torque control means for performing a torque control in such a manner that the output torque estimated by the output torque estimating means, which is referred to as the estimated torque, follows the target torque, wherein when obtaining the estimated torque, the output torque estimating means corrects the estimated torque according to the fuel property so as to vary a control amount of the torque control.

2. A controller for an internal combustion engine according to claim 1, wherein
   the internal combustion engine uses any one of gasoline, alcohol, and alcohol mixed fuel of gasoline and alcohol, and
   the fuel property detecting means is an alcohol concentration sensor detecting alcohol concentration as the fuel property.

3. A controller for an internal combustion engine according to claim 1, further comprising:
   an intake air flow rate adjusting means for adjusting an intake air flow rate of the internal combustion engine; and
   an intake air flow rate converting means for converting the target torque to an target intake air flow rate, wherein
   the output torque estimating means computes an estimated intake air flow rate as an information of the estimated torque by use of a physical model considering an air flow rate passing through a throttle valve and/or a delay in response of an intake system,
   the torque control means controls the intake air flow rate adjusting means in such a manner that the estimated intake air flow rate follows the target intake air flow rate.

4. A controller for an internal combustion engine according to claim 3, wherein
   the intake air quantity adjusting means adjusts at least one of a throttle opening, an intake valve lift amount, an intake valve opening timing, an exhaust valve opening timing, and a waste gate valve opening.

5. A controller for an internal combustion engine according to claim 1, further comprising:
   an abnormality diagnosis means for determining whether the fuel property detecting means is abnormal; and
   an abnormality control means for prohibiting a process in which the estimated torque is corrected according to the detected fuel property and performing a process in which the ignition timing is retarded and/or a process in which the throttle opening is reduced, when the abnormality diagnosis means determines that the fuel property detecting means is abnormal.

6. A controller for an internal combustion engine according to claim 5, wherein
   the abnormality diagnosis means computes, based on the fuel property, an estimated starting period of the internal combustion engine from a time when a cranking is started to a time when the cranking is completed,
   the abnormality diagnosis means measures an actual starting period of the internal combustion engine from a time when the cranking is started to a time when the cranking is completed, and
   the abnormality diagnosis means compares the estimated starting period with the actual starting period in order to determine whether the fuel property detecting means is abnormal.

7. A controller according to claim 5, wherein
   the abnormality diagnosis means varies a determination condition for determining whether the fuel property detecting means is abnormal based on at least one of a coolant temperature, an oil temperature, an intake air temperature, and an atmospheric pressure.

* * * * *